United States Patent
Schafer et al.

(10) Patent No.: US 7,779,799 B2
(45) Date of Patent: Aug. 24, 2010

(54) DEVICE FOR MODIFYING CONTROL TIMES OF AN INTERNAL COMBUSTION ENGINE

(75) Inventors: Jens Schafer, Herzogenaurach (DE); Mike Kohrs, Wilthen (DE)

(73) Assignee: Schaeffler KG, Herzogenaurach (DE)

( * ) Notice: Subject to any disclaimer, the term of this patent is extended or adjusted under 35 U.S.C. 154(b) by 459 days.

(21) Appl. No.: 11/721,559

(22) PCT Filed: Nov. 11, 2005

(86) PCT No.: PCT/EP2005/012095

§ 371 (c)(1),
(2), (4) Date: Jun. 13, 2007

(87) PCT Pub. No.: WO2006/074735

PCT Pub. Date: Jul. 20, 2006

(65) Prior Publication Data

US 2009/0272347 A1    Nov. 5, 2009

(30) Foreign Application Priority Data

Dec. 23, 2004   (DE)   ................ 10 2004 062 067

(51) Int. Cl.
*F01L 1/34*   (2006.01)
(52) U.S. Cl. ............... 123/90.17; 123/90.15; 123/90.31
(58) Field of Classification Search .............. 123/90.15, 123/90.16, 90.17, 90.31
See application file for complete search history.

(56) References Cited

U.S. PATENT DOCUMENTS

| 3,831,762 | A | 8/1974 | Schulz |
| 5,005,437 | A | 4/1991 | Furer et al. |
| 7,137,370 | B2 * | 11/2006 | Axmacher et al. ....... 123/90.17 |

FOREIGN PATENT DOCUMENTS

| DE | 3539535 | 5/1986 |
| DE | 19953485 | 5/2001 |
| DE | 10038354 | 2/2002 |
| DE | 10314475 | 1/2004 |

* cited by examiner

*Primary Examiner*—Zelalem Eshete
(74) *Attorney, Agent, or Firm*—Volpe and Koenig PC

(57) ABSTRACT

A device (1) for modifying the control times of an internal combustion engine (100) is provided, including a drive gear (13), a driven element (4) and a swashplate mechanism (2). The torque of the crankshaft (101) is transferred via a primary drive to the drive gear (13), and via the swashplate mechanism (2) to the driven element (4) which is connected in a rotationally fixed manner to the camshaft (11). The drive gear (13) can be rotated in relation to the driven element (4) via the swashplate mechanism (2), whereby a continuous phase modification of the camshaft (11) relative to the crankshaft is possible. According to the invention, foreign body collecting pockets (33) are provided in the housing of the swashplate mechanism (2), wherein foreign substances entering into the lubricant can be collected.

5 Claims, 4 Drawing Sheets

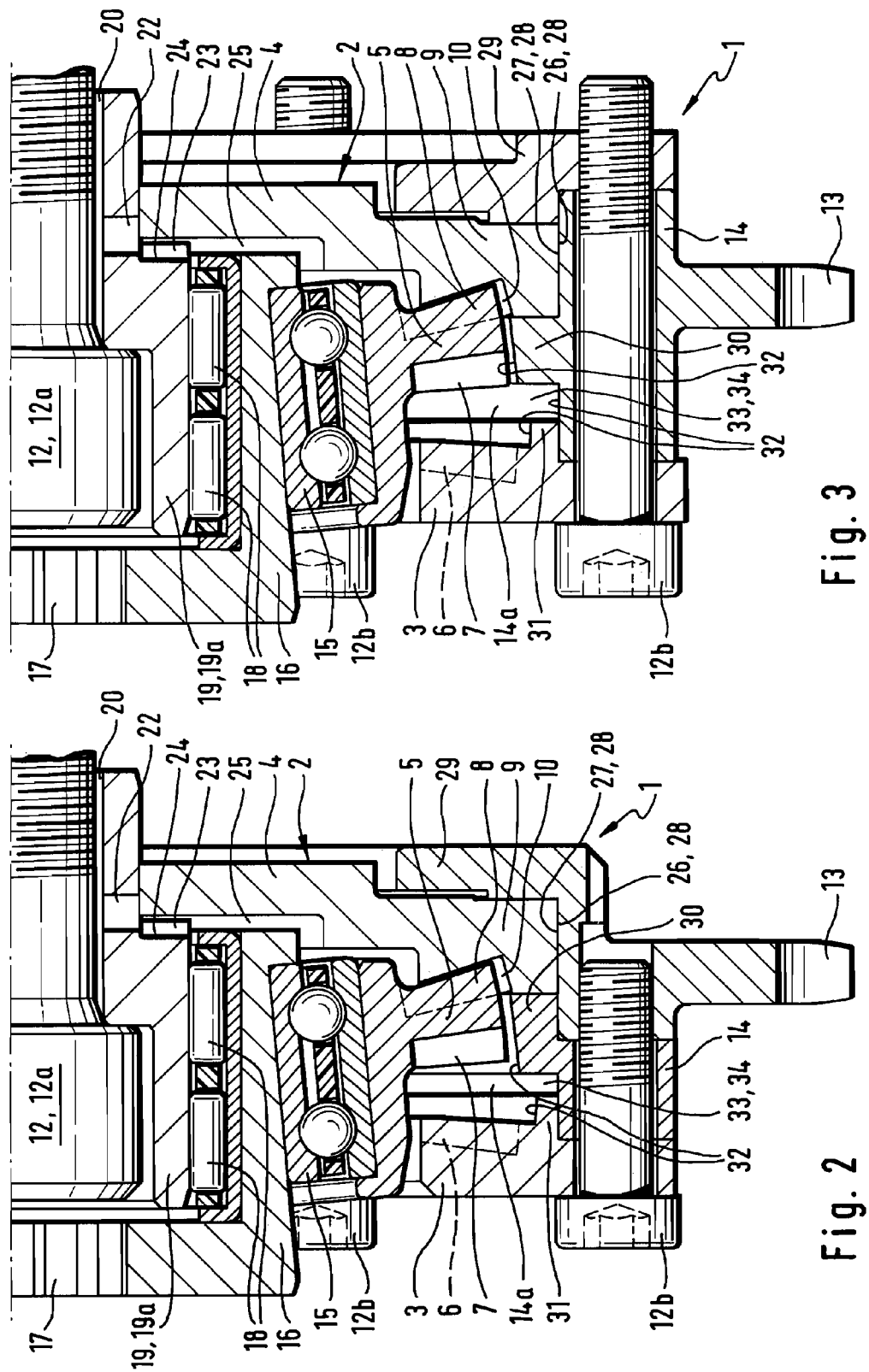

DEVICE FOR MODIFYING CONTROL TIMES OF AN INTERNAL COMBUSTION ENGINE

BACKGROUND

The invention relates to a device for modifying the control times of gas-exchange valves of an internal combustion engine with a drive wheel in driven connection with a crankshaft and with a swashplate drive, which has at least one housing and a driven element in driving connection with a camshaft, wherein the housing and the driven element define a ring-shaped hollow space.

In internal combustion engines, camshafts are used for actuating the gas-exchange valves. Camshafts are mounted in the internal combustion engine such that cams mounted on these camshafts contact cam followers, for example, cup tappets, rocker arms, or finger levers. If the camshaft is set in rotation, then the cams roll on the cam followers, which in turn actuate the gas-exchange valves. Thus, both the opening period and also the amplitude, but also the opening and closing times of the gas-exchange valves, are set by the position and the shape of the cams.

Modern engine concepts allow variable valve train designs. On one hand, the valve lift and valve opening period should be made variable up to complete shutdown of individual cylinders. For this purpose, concepts such as switchable cam followers, variable valve trains, or electrohydraulic or electrical valve actuators are provided. Furthermore, it has been shown to be advantageous to be able to influence the opening and closing times of the gas-exchange valves during the operation of the internal combustion engine. It is likewise desirable to be able to influence the opening or closing times of the intake or exhaust valves separately, in order, for example, to be able to selectively set a defined valve overlap. By setting the opening or closing times of the gas-exchange valves depending on the current engine-map range, for example, the current rotational speed or the current load, the specific fuel consumption can be lowered, which has a positive effect on the exhaust-gas behavior and increases the engine efficiency, the maximum torque, and the maximum output.

The described variability in the gas-exchange valve time control is implemented through a relative change of the phase position of the camshaft relative to the crankshaft. Here, the camshaft is usually in a driven connection with the crankshaft via a chain drive, belt drive, gearwheel drive, or equivalent drive concepts. Between the chain drive, belt drive, or gearwheel drive driven by the crankshaft and the camshaft there is a camshaft adjuster, which transmits the torque from the crankshaft to the camshaft. Here, this device for modifying the control times of the internal combustion engine is constructed such that during the operation of the internal combustion engine, the phase position between the crankshaft and camshaft is held reliably and, if desired, the camshaft can be rotated within a certain angular range relative to the crankshaft.

In internal combustion engines with separate camshafts for the intake and exhaust valves, these can each be equipped with a camshaft adjuster. Therefore, the opening and closing times of the intake and exhaust gas-exchange valves can be shifted in time relative to each other and the valve overlaps are set selectively.

The location of modern camshaft adjusters is generally located on the drive-side end of the camshaft. It is comprised of a crankshaft-fixed drive wheel, a camshaft-fixed driven element, and an adjustment mechanism transmitting the torque from the drive wheel to the driven part. The drive wheel can be constructed as a chain, belt, or gearwheel and is locked in rotation with the crankshaft by means of a chain, belt, or gearwheel drive. The adjustment mechanism can be operated electromagnetically, hydraulically, or pneumatically. Mounting the camshaft adjuster on an intermediate shaft or supporting it on a non-rotating component is similarly conceivable. In this case, the torque is transmitted via additional drives to the camshaft.

Electrically operated camshaft adjusters are comprised of a drive wheel, which is in driven connection with the crankshaft of the internal combustion engine, a driven part, which is in driving connection with a camshaft of the internal combustion engine, and adjustment gearing. The adjustment gearing involves a triple-shaft gear mechanism, with three components rotating relative to each other. Here, the first component of the gearing is locked in rotation with the drive wheel and the second component is locked in rotation with the driven part. The third component is constructed, for example, as a toothed component, whose rotational speed can be regulated via a shaft, for example, by means of an electric motor or a braking device.

The torque is transmitted from the crankshaft to the first component and from there to the second component and thus to the camshaft. This happens either directly or under intermediate connection of the third component.

Through suitable regulation of the rotational speed of the third component, the first component can be rotated opposite the second component and thus the phase position between the camshaft and crankshaft can be changed. Examples for such triple-shaft gear mechanisms are internal eccentric gear mechanisms, double-internal eccentric gear mechanisms, shaft gear mechanisms, swashplate gear mechanisms, or the like.

For controlling the camshaft adjuster, sensors detect the characteristic data of the internal combustion engine, for example, the load state, the rotational speed, and the angular positions of the camshaft and crankshaft. This data is fed to an electronic control unit, which controls the adjustment motor of the camshaft adjuster after comparing the data with an engine-map range of the internal combustion engine.

From DE 100 38 354 a device for modifying the control times of an internal combustion engine is known, in which the torque transmission from the crankshaft to the camshaft and the adjustment process are realized by means of a swashplate gear mechanism. The device shown in FIG. 2 essentially comprises a drive wheel, a housing, a drive conical gearwheel, a camshaft-fixed driven element, and a swashplate. The drive wheel is in driven connection with a crankshaft and is constructed in one piece with the housing and the drive conical gearwheel. The housing, the drive conical gearwheel, and the driven element form a ring-shaped hollow space, in which the swashplate is arranged. The swashplate is supported at a defined contact angle on an adjustment shaft and is provided with a toothed ring on both axial side surfaces. Furthermore, the axial side surfaces of the drive conical gearwheel and the driven element facing the swashplate are likewise provided with a toothed ring. The toothed rings of the swashplate engage in the corresponding toothed rings of the drive conical gearwheel and the driven element. Here, the engagement takes place only within an angle segment, wherein the size of the angle segment is dependent on the contact angle of the swashplate. The torque of the crankshaft is transmitted via the drive wheel, the housing, the drive conical gearwheel, the swashplate, and the driven element to the camshaft.

The toothed rings of at least one gearing pair have different numbers of teeth.

The adjustment shaft is in driven connection with a drive unit, for example, an electric motor, which can drive this with continuously variable rotational speeds. Rotating the adjustment shaft relative to the driven element leads to a wobble rotation of the swashplate and thus to a rotation of the engaged angle segment relative to the drive conical gearwheel, the driven element, and the swashplate. Due to the different numbers of teeth of the conical gearwheel gearing, this leads to a relative rotation of the camshaft with respect to the crankshaft.

Lubricant is fed to the swashplate gearing, which has the task of reducing the friction, the wear, and the development of noise in contact positions with relative motion, for example, tooth contacts, sliding or cylinder bearings. Foreign particles can enter into the device with the lubricant and collect in the device. The foreign particles can involve, for example, original contamination of the internal combustion engine or rubbed-off metal particles produced during the operation of the internal combustion engine. Here, the foreign particles can find their way to the contact points with relative motion and damage the device.

SUMMARY

The invention is based on the objective of providing a device for modifying control times of gas-exchange valves of an internal combustion engine, wherein damage to the device due to foreign particles entering into the device with the lubricant is prevented.

According to the invention, this objective is met in that at least one foreign-particle collection pocket for at least the primary collection of foreign particles is formed on a limiting surface limiting the hollow space radially on the outside.

Here, it can be provided that several foreign-particle collection pockets are formed spaced apart in the peripheral direction or that the foreign particle collection pocket is formed as a ring groove running on the limiting surface. It is further provided that lubricant is fed to the device, wherein the foreign particles contained in the lubricant are forced into the foreign-particle collection pockets due to the rotation of the device.

The device rotates during the operation of the internal combustion engine essentially at the rotational speed of the camshaft. Due to the resulting centrifugal forces, foreign particles present in the device are forced radially outwards, wherein these are deposited on the inner casing surface of the housing. In the embodiment according to the invention, the foreign particles are fed into the foreign-particle collection pockets and thus kept away from the contact points with relative motion. In the case of a device, to which lubricant is fed from the motor oil circuit of the internal combustion engine, through the formation of the foreign particle collection pockets it is prevented that the foreign particles deposited in the foreign particle collection pockets are flushed by lubricant circulating in the device back to the teeth engaging area, and the sliding or roller bearings. Therefore, the risk of damage to the contact points with relative motion due to foreign particles is reduced considerably.

The foreign particles can involve, for example, original contamination of the internal combustion engine, which is produced during the production of the internal combustion engine and remains in it also after various cleaning processes. It can further involve rubbed-off material, which is produced during the operation of the internal combustion engine.

The foreign particle collection pockets can be formed in the housing during the shaping process, for example, of the housing. Production tools, for example, sintering or shaping tools, are to be taken into consideration for this purpose. These result in hardly any extra costs in the production of the housing.

In one advantageous improvement of the invention, the housing is provided with a radial opening and the foreign particle collection pocket communicates with the exterior of the device via the radial opening.

In this improvement, one or more radial openings extend radially outwards starting from the base of the foreign particle collection pocket, wherein the radial openings penetrate the outer casing surface of the housing. In this way, the lubricant pressed onto the inner casing surface of the housing can escape into the cylinder head or the crankcase. Through this radially outwardly directed flow of lubricant, the foreign particles are reliably fed into the foreign particle collection pockets. Furthermore, the foreign particles are prevented from falling back by the lubricant flow and are blocked from the circulation of the lubricant within the device.

The radial openings can be formed, for example, in the shaping process of the housing, through consideration of the radial openings in the shaping tool. It is also conceivable to form these at a later time through bores or tangential punchouts.

In addition, it can be provided that the radial openings are constructed so that the foreign particles located in the device are forced out of the device through the radial openings during the operation of the internal combustion engine.

The foreign particles entering into the device with the lubricant or already found in the device are led onto the inner casing surface of the housing and finally into the foreign-particle collection pockets due to the centrifugal forces acting on the particles. This is supported by the lubricant flow, which is established between the lubricant inlet and the radial openings. The foreign particles led into the foreign particle collection pockets pass through the radial openings, for a suitable size of the radial openings, due to the centrifugal forces and the lubricant flow, and thus leave the device.

In the case of a ring groove running on the inner casing surface of the housing, one or more radial openings spaced apart in the peripheral direction can be provided. During the operation of the internal combustion engine, the foreign particles fed into the ring groove are first fed due to the lubricant flow to one of the radial openings and then forced outwards through these openings after reaching a radial opening.

The foreign particles are led away from the contact points with relative movement and either securely stored in the foreign particle collection pockets or forced out of the device. Therefore, damage to the device is effectively counteracted.

BRIEF DESCRIPTION OF THE DRAWINGS

Additional features of the invention emerge from the following description and the associated drawings, in which embodiments of the invention are shown schematically. Shown are.

DETAILED DESCRIPTION OF THE PREFERRED EMBODIMENTS

Figure 1:
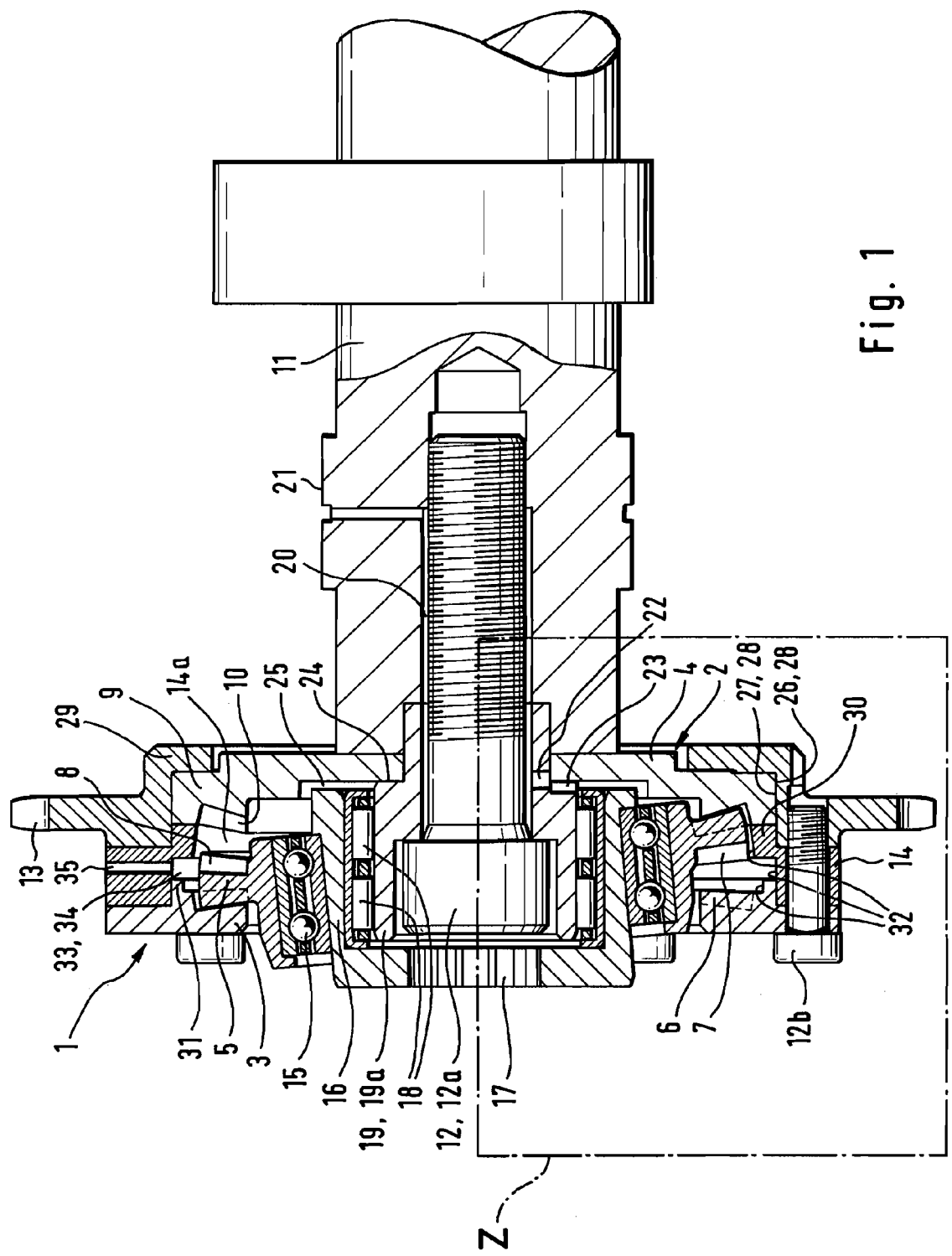
FIG. 1 a longitudinal cross-sectional view through a first embodiment according to the invention of a device for modifying the control times of gas-exchange valves of an internal combustion engine, wherein the device is mounted on a camshaft, FIG. 2 an enlarged view of detail Z shown in FIG. 1, wherein the camshaft is not shown, FIG. 3 a view of detail Z analogous to FIG. 2 of a second embodiment according to the invention of a device for modifying the control times of gas-exchange valves of an internal combustion engine, FIG. 4 a view of detail Z analogous to FIG. 2 of a third embodiment according to the invention of a device for modifying the control times of gas-exchange valves of an internal combustion engine.
Figure 1A:
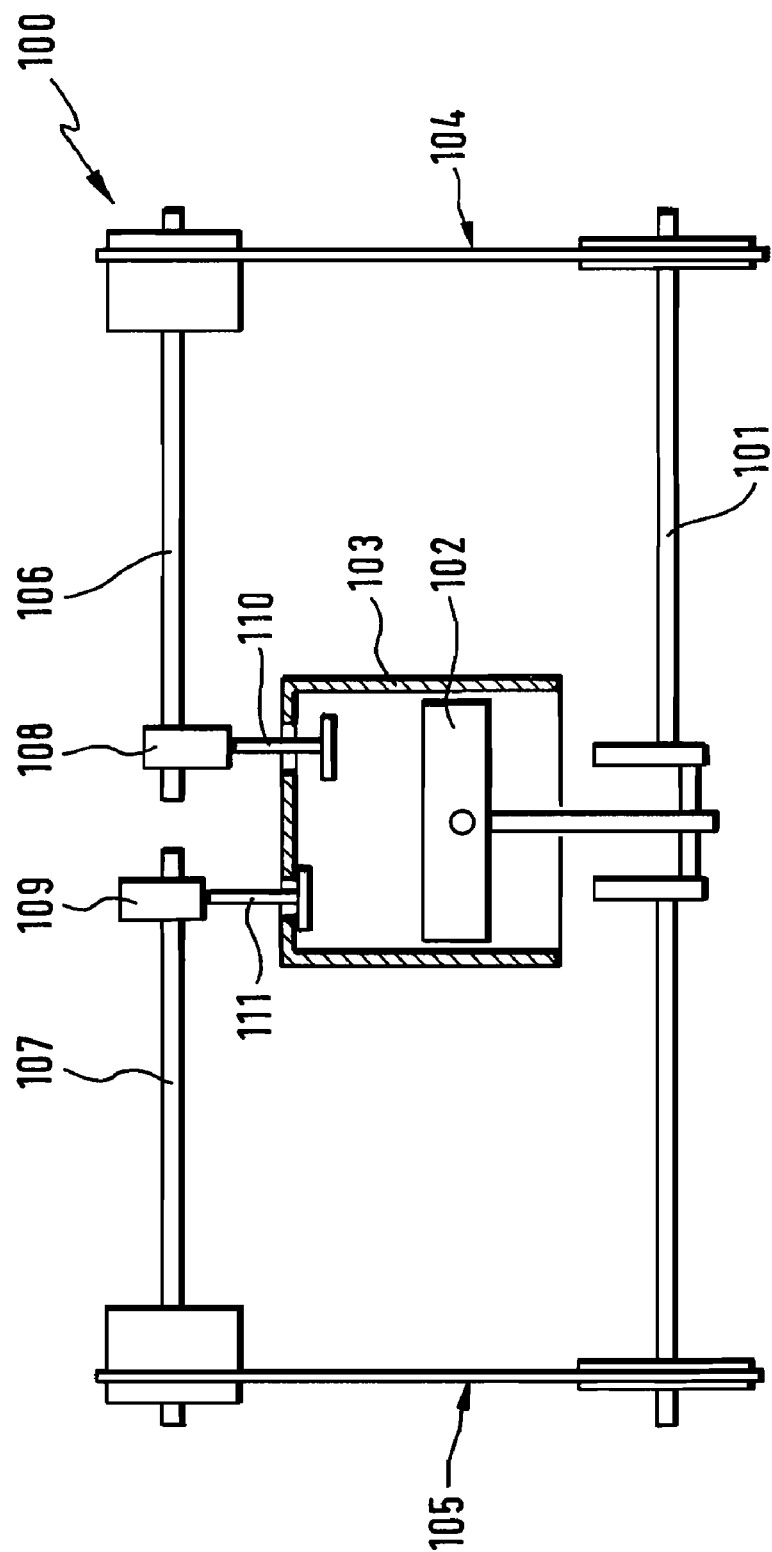
FIG. 1a a schematic view of an internal combustion engine.

In FIG. 1a, an internal combustion engine 100 is sketched, wherein a piston 102 connected to a crankshaft 101 is shown in a cylinder 103. The crankshaft 101 is in connection in the shown embodiment via a power-transmission means drive 104 and 105 with an intake camshaft 106 and an exhaust camshaft 107, respectively, wherein a first and a second device 1 for relative rotation between the crankshaft 101 and camshafts 106, 107 can be provided. Cams 108, 109 of the camshafts 106, 107 actuate an intake gas-exchange valve 110 and exhaust gas-exchange valve 111, respectively.

FIG. 1 shows an embodiment of a device 1 according to the invention for modifying the control times of an internal combustion engine 100. The device 1 comprises, among other things, a swashplate gear mechanism 2 comprised of a drive conical gearwheel 3, a driven element 4, and a swashplate 5. A first toothed ring 6 constructed as conical gearing is formed on an axial side surface of the drive conical gearwheel 3. Furthermore, second and third toothed rings 7, 8 are constructed on the axial side surfaces of the swashplate 5, wherein the toothed rings 7, 8 are each constructed in this embodiment also as conical gearing. Here, the second toothed ring 7 is formed on the axial side surface facing the drive conical gearwheel 3 and the third toothed ring 8 is formed on the axial side surface of the swashplate 5 facing the driven element 4. The radially outer section of the driven element 4 is constructed as gearing carrier 9, on whose axial side surface facing the swashplate 5 there is a fourth toothed ring 10. The fourth toothed ring 10 is also constructed in this embodiment as conical gearing.

The driven element 4 is locked in rotation with a camshaft 11. The connection between the driven element 4 and camshaft 11 is realized in the shown embodiment by means of a first attachment means 12, here an attachment screw 12a. Also conceivable are positive, material, friction, or form fit connection methods.

A drive wheel 13 is in active connection with a not-shown primary drive, by means of which a torque is transmitted from the crankshaft 101 to the drive wheel 13. Such a primary drive can be, for example, a chain, belt, or gearwheel drive. The drive wheel 13 is locked in rotation with a housing 14, and the housing 14 is locked in rotation, in turn, with the drive conical gearwheel 3. In the embodiment shown in FIG. 1, these components are connected to each other by means of second attachment means 12b, which are constructed in the shown embodiment as screws. Alternatively, the housing 14 can be connected to the drive conical gearwheel 3 and/or to the drive wheel 13 with a positive, form, friction or material fit or at least two of the components can be constructed as one piece.

The drive conical gearwheel 3 and the driven element 4 are parallel to each other and spaced apart from each other in the axial direction. Together with the housing 14, the drive conical gearwheel 3 and the driven element 4 form a ring-shaped hollow space 14a, in which the swashplate 5 is arranged. By means of first cylinder bearings 15, the swashplate 5 is supported at a defined contact angle to the drive conical gearwheel 3 and the driven element 4 on an adjustment shaft 16. The essentially pot-shaped adjustment shaft 16 is provided with a coupling element 17, in which a not-shown shaft of a similarly not-shown device engages, with which the rotational speed of the adjustment shaft 16 can be regulated. In this embodiment, the adjustment shaft 16 is to be driven by means of a not-shown electric motor, wherein a not-shown shaft of the electric motor interacts with the coupling element 17. However, other devices for regulating the rotational speed of the adjustment shaft are also conceivable. The adjustment shaft 16 is supported by means of second cylinder bearings 18 on a shaft 19a locked in rotation with the camshaft 11 and formed in the present embodiment as a hollow shaft 19. Also conceivable is the bearing of the adjustment shaft 16 on a screw head of the attachment screw 12a and/or a bearing of the swashplate 5 on the adjustment shaft 16 by means of a slide bearing.

The swashplate 5 arranged at a defined contact angle on the adjustment shaft 16 engages with the second toothed ring 7 in the first toothed ring 6 of the drive conical gearwheel 3 and with the third toothed ring 8 in the fourth toothed ring 10 of the driven element 4. Here, the appropriate toothed rings 6, 7, 8, 10 are each engaged only in a certain angular range, wherein the size of the angle range is dependent on the contact angle of the swashplate 5.

Through the engagement of the toothed rings 6, 7, 8, 10, the torque of the crankshaft 101 transmitted from the primary drive to the drive wheel 13 and from there to the drive conical gearwheel 3 is transmitted via the swashplate 5 to the driven element 4 and thus to the camshaft 11.

If the adjustment shaft 16 is driven by means of an electric motor via a shaft engaging in the coupling element 17, then the adjustment shaft 16 is driven at the rotational speed of the drive wheel 13, in order to keep the phase position between camshaft 11 and crankshaft 101 constant. If the phase position is to be changed, then the rotational speed of the adjustment shaft 16 increases or decreases according to whether the camshaft 11 advances or lags relative to the crankshaft 16. Through the different rotational speed of the adjustment shaft 16, the swashplate 5 executes a wobbling rotation, wherein the angle regions, in which the toothed rings 6, 7, 8, 10 intermesh, rotate about the swashplate 5, the drive conical gearwheel 3, and the driven element 4. For at least one of the toothed ring pairs, the two intermeshing toothed rings 6, 7, 8, 10 have different numbers of teeth. If the angle regions, in which the toothed rings 6, 7, 8, 10 intermesh rotate about the swashplate 5 completely once, then the drive conical gearwheel 3 is adjusted relative to the driven element 4 and thus the camshaft 11 relative to the crankshaft 101 due to the difference in the number of teeth. The adjustment angle corresponds to the area that the teeth forming the difference in the number of teeth assume.

In this connection, it is conceivable that the intermeshing toothed rings 6, 7, 8, 10 of both toothed ring pairs have different numbers of teeth. Thus, the adjustment speed-reduction ratio is given from the two resulting conversion ratios.

It is also conceivable that the toothed rings 6, 7, 8, 10 have only one toothed ring pair with different numbers of teeth. The speed-reduction ratio is given in this case only based on this speed reduction. The other toothed ring pair is used in this case only as coupling with a speed reduction of 1:1 between the swashplate 5 and the associated component 3, 4.

Between the attachment screw 12a and the hollow shaft 19 or the camshaft 11 there is a ring channel 20, which is provided with lubricant via a camshaft bearing 21. On the hollow shaft 19, a through hole 22 and an impression 23 are formed, by means of which the ring channel 20 communicates with the hollow space 14a of the swashplate gear mechanism 2. The impression 23 is formed in the clamping surface 24 of the hollow shaft 19 and can be formed economically during the shaping process of the hollow shaft 19, wherein this can be considered in the molding or sintering tool. The through hole 22 can be, for example, stamped or tangentially punched out.

Between the impression 23 and the hollow space 14a there is a radial gap 25. The radial gap 25 acts as a diaphragm for the lubricant flow. The diaphragm has the effect that in front of the diaphragm, the lubricant is under pressure. In this way, it is possible on one side for lubricant to penetrate into the hollow space 14a, while a sufficient supply of lubricant to the second cylinder bearings 18 is fed to the other side.

During the adjustment process, the drive wheel 13 or the housing 14 rotates relative to the driven element 4 according to the conversion ratio of the swashplate gear mechanism 2 and the relative rotational speed of the adjustment shaft 16 to the drive wheel 13. An outer casing surface of the driven element 4 is formed as a first radial bearing surface 26. Furthermore, at least one part of an inner casing surface of the drive wheel 13 or the housing 14 is formed as a second radial bearing surface 27. The two radial bearing surfaces 26, 27 interact as radial bearings 28, whereby the drive wheel 113 or the housing 14 is supported rotatably on the driven element 4.

In the embodiment shown in FIGS. 1 and 2, for a device 1 according to the invention, the drive wheel 13, the housing 14, and the drive conical gearwheel 3 are supported axially by means of a stop plate 29 and a projection 30, which are supported in the axial direction on the teeth carrier 9. The stop plate 29 is constructed in one piece with the drive wheel 13. Also conceivable is a separately produced stop plate 29, which is connected to the drive wheel 13 with a material, friction, form, or positive fit. Also conceivable is an attachment by means of attachment means, for example, screws.

The projection 30 is formed in one piece with the housing 14 in the shown embodiment.

Furthermore, a centering edge 31, which is used to center the housing 14 during the mounting of the device 1 relative to the drive conical gearwheel 3, is formed on the drive conical gearwheel 3.

The centering edge 31 and the housing 14 form a limiting surface 32, which limits the ring-shaped hollow space 14a outwards in the radial direction. The centering edge 31 and the housing 14 are constructed, such that a foreign-particle collection pocket 33 is formed by their interaction. Also several foreign-particle collection pockets 33 can be provided spaced apart in the peripheral direction or one foreign-particle collection pocket 33 in the form of a ring groove 34 running in the peripheral direction of the device along the limiting surface 32.

Due to the high rotational speeds of the device 1 during the operation of the internal combustion engine 100, foreign particles in the device 1 and the lubricant entering via the radial gap 25 are driven to the limiting surface 32. The foreign particles are forced by the constant lubricant flow into the foreign-particle collection pockets 33, in which they collect and are kept from circulating with the lubricant. This prevents the foreign particles from penetrating into the tooth contact positions and the slide or roller bearing positions and damaging these positions.

In addition to the foreign particle collection pockets 33, radial openings 35 can be provided. Advantageously, for each foreign-particle collection pocket 33 there is at least one radial opening 35. The radial openings 35 are formed in this embodiment in the housing 14 and connect the hollow space 14a to the outside of the device 1. Due to the effective centrifugal forces, a lubricant flow from the radial gap 25 via the foreign-particle collection pockets 33 is established through the radial openings 35. This leads to the fact that, supported by the centrifugal forces, foreign particles leading into the foreign-particle collection pockets 33 are forced out of the device 1 through the radial openings 35. Here, care must be taken only that the size of the radial openings 35 is to be formed larger than the size of the expected foreign particles.

FIG. 3 shows a second possible embodiment of the invention. This embodiment is essentially identical to the first embodiment, which is why the same reference numbers were used.

In contrast to the first embodiment, here the drive wheel 13 is formed in one piece with the housing 14 and the stop plate 29 is formed as a separate component, wherein this is locked in rotation with the housing 14 by means of the second attachment means 12b.

On the limiting surface 32 of the hollow space 14a there is, in turn, at least one foreign particle collection pocket 33 or one ring groove 34, which can be constructed, in turn, closed radially outwardly or which can be provided with radial openings 35.

Figure 4:
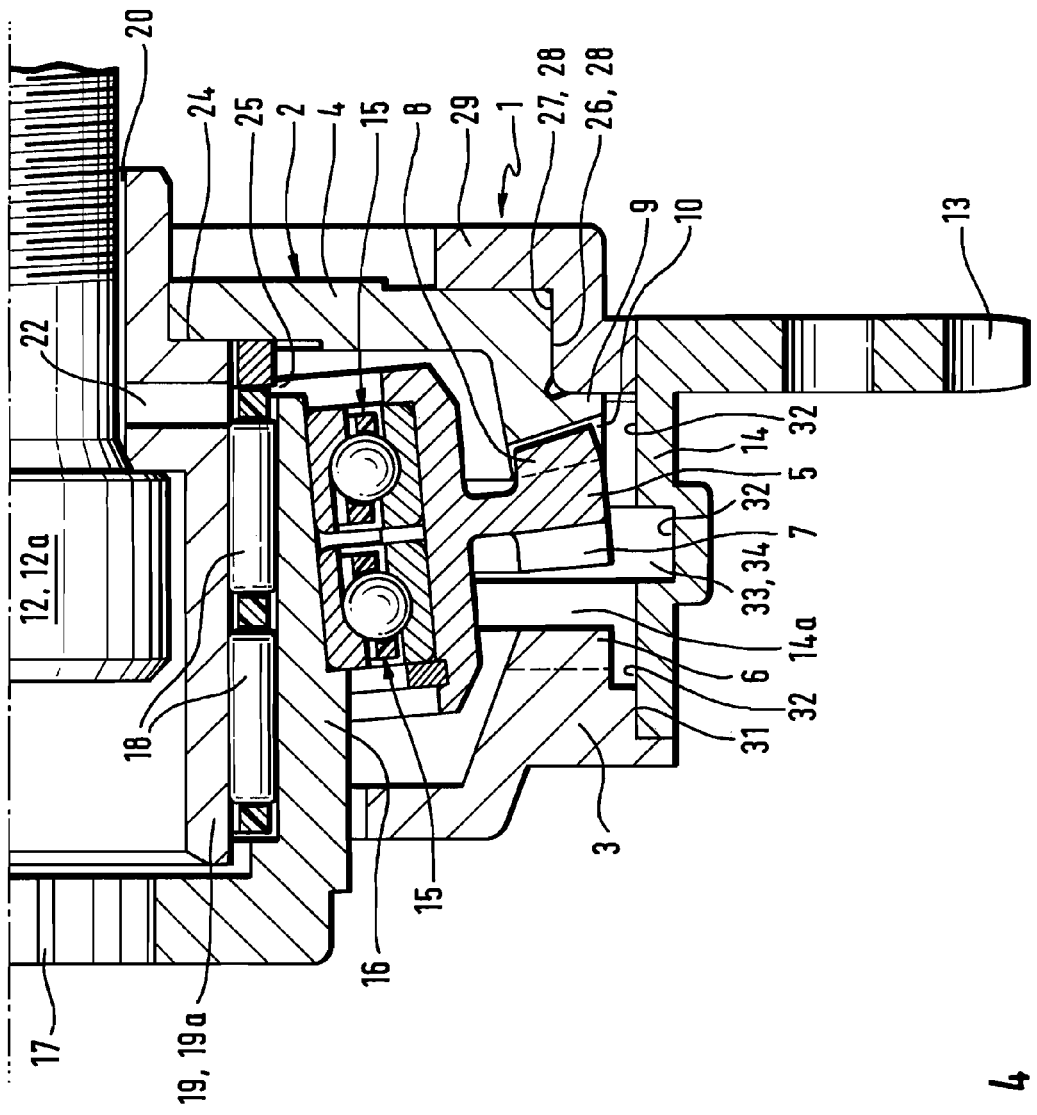

FIG. 4 shows a third possible embodiment of the invention. This embodiment is essentially identical to the first and second embodiments, which is why the same reference numbers are used.

In contrast to the second embodiment, the housing 14 is connected in this case to the drive conical gearwheel 3 and the stop plate 29 with a positive, friction, material, or form fit. Furthermore, the foreign-particle collection pockets 33 are realized through the formation of an impression in the housing 14. Conceivable here are, in turn, one or more foreign particle collection pockets 33 or one foreign particle collection pocket 33 in the form of a ring groove 34. The foreign particle collection pockets 33 can be constructed, in turn, closed radially outwards or provided with radial openings 35.

The drive wheel 13 and the housing 14 are produced in one part, for example, through non-cutting shaping of a sheet-metal part or through sintering. Here, the foreign-particle collection pockets 33 are formed in the housing 14 during the non-cutting shaping process. No additional processing steps are necessary.

LIST OF REFERENCE NUMBERS

1 Device
2 Swashplate gear mechanism
3 Drive conical gearwheel
4 Driven element
5 Swashplate
6 First toothed ring
7 Second toothed ring
8 Third toothed ring
9 Teeth carrier
10 Fourth toothed ring
11 Camshaft
12 First attachment means
12a Attachment screw
13 Drive wheel
14 Housing
14a Hollow space
15 First cylinder bearing
16 Adjustment shaft
17 Coupling element
18 Second cylinder bearing
19 Hollow shaft
19a Shaft
20 Ring channel
21 Camshaft bearing
22 Through hole
23 Impression
24 Clamping surface 25 Radial gap
26 First radial bearing surface
27 Second radial bearing surface
28 Radial bearing
29 Stop plate
30 Projection
31 Centering wedge
32 Limiting surface
33 Foreign-particle collection pocket
34 Ring groove
35 Radial openings
100 Internal combustion engine
101 Crankshaft
102 Piston
103 Cylinder
104 Power-transmission means drive
105 Power-transmission means drive
106 Intake camshaft
107 Exhaust camshaft
108 Cam
109 Cam
110 Intake gas-exchange valve
111 Exhaust gas-exchange valve

The invention claimed is:

1. Device for modifying the control times of gas-exchange valves of an internal combustion engine comprising:

a drive wheel in driven connection with a crankshaft, a swashplate gear mechanism, which has at least one housing and one driven element in driving connection with a camshaft, wherein the housing and the driven element define a ring-shaped hollow space, and at least one foreign-particle collection pocket for at least primarily holding foreign particles formed on a limiting surface limiting the hollow space in a radially outward direction, the at least one pocket having a defined depth limited by a radially outer wall of the pocket defined in the housing.

2. Device according to claim 1, wherein the foreign-particle collection pocket is formed as a ring groove extending on the limiting surface.

3. Device according to claim 1, wherein lubricant is fed to the device, and the foreign particles contained in the lubricant are forced into the foreign-particle collection pocket due to a rotation of the device.

4. Device according to claim 1, wherein the housing is provided with a radial opening and the foreign-particle collection pocket communicates outside of the device via the radial opening.

5. Device according to claim 4, wherein the radial opening comprises a plurality of radial openings constructed so that the foreign particles in the device are forced out of the device through the radial openings during operation of the internal combustion engine.

* * * * *